United States Patent
Nishimura et al.

(10) Patent No.: US 7,881,700 B2
(45) Date of Patent: Feb. 1, 2011

(54) INFORMATION COMMUNICATION APPARATUS AND MESSAGE DISPLAYING METHOD

(75) Inventors: Yoshimasa Nishimura, Kawasaki (JP); Koichi Asano, Yokosuka (JP); Hyunsuk Seung, Yokohama (JP); Akihiro Ichinose, Yokohama (JP); Ai Nagai, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 633 days.

(21) Appl. No.: 11/794,482

(22) PCT Filed: Sep. 26, 2006

(86) PCT No.: PCT/JP2006/319039

§ 371 (c)(1),
(2), (4) Date: Jun. 29, 2007

(87) PCT Pub. No.: WO2007/040093

PCT Pub. Date: Apr. 12, 2007

(65) Prior Publication Data

US 2009/0280778 A1 Nov. 12, 2009

(30) Foreign Application Priority Data

Sep. 30, 2005 (JP) ............................. 2005-287624

(51) Int. Cl.
H04M 1/725 (2006.01)
(52) U.S. Cl. .................................. 455/412.1; 455/412.2
(58) Field of Classification Search ........................ None
See application file for complete search history.

(56) References Cited

U.S. PATENT DOCUMENTS 5,528,759 A * 6/1996 Moore ......................... 709/224

(Continued)

FOREIGN PATENT DOCUMENTS

EP 1 555 797 A1 7/2005

(Continued)

OTHER PUBLICATIONS

Hashimoto, S. et al., InterSafe Ver. 3.1, N+1 Network, vol. 4, No. 1, pp. 158-159, 2004. (With partial English translation).

(Continued)

*Primary Examiner*—Erika A Gary
(74) *Attorney, Agent, or Firm*—Oblon, Spivak, McClelland, Maier & Neustadt, L.L.P.

(57) ABSTRACT

A cell phone 1 is characterized by having a problem determination storage 3 for storing problem finding information for determining whether there is a problem in received data received by a radio communicator 2, in correspondence to a fixed message, and for storing an arbitrary message available for arbitrary correspondence to the problem finding information; an arbitrary message determination processor 5 for determining whether an arbitrary message is stored in correspondence to the problem finding information in the problem determination storage 3, when it is determined that there is a problem in the received data; and an operation controller 6 for displaying the arbitrary message when the arbitrary message determination processor 5 determines that the arbitrary message is stored, and for displaying the fixed message stored in the problem determination storage 3, when it is determined that no arbitrary message is stored.

5 Claims, 9 Drawing Sheets

U.S. PATENT DOCUMENTS

| | | | |
|---|---|---|---|
| 2004/0128536 A1* | 7/2004 | Elzam et al. | 713/201 |
| 2004/0209609 A1 | 10/2004 | Kouznetsov et al. | |
| 2005/0005160 A1* | 1/2005 | Bates et al. | 713/200 |
| 2005/0164721 A1* | 7/2005 | Eric Yeh et al. | 455/466 |
| 2005/0283837 A1* | 12/2005 | Olivier et al. | 726/24 |

FOREIGN PATENT DOCUMENTS

| | | |
|---|---|---|
| JP | 10-124570 | 5/1998 |
| JP | 2002 290990 | 10/2002 |
| JP | 2002 335288 | 11/2002 |
| JP | 2003-99339 | 4/2003 |
| JP | 2003 132001 | 5/2003 |
| JP | 2004-523012 | 7/2004 |
| JP | 2004 236234 | 8/2004 |
| JP | 2005-134974 | 5/2005 |
| JP | 2005-151437 | 6/2005 |
| KR | 10-2007-0046775 | 5/2007 |
| WO | 2004 057435 | 7/2004 |

OTHER PUBLICATIONS

Ogino, K. et al.,"Imasara Kikenai Internet Shokyu Guide IE & OE no Joshiki", Dai 52 Kai PCfan, vol. 12 No. 2, pp. 100-101, 2005. (With partial English translation).

* cited by examiner

| PROBLEM PATTERN | PROBLEM LEVEL | PROBLEM ELEMENT NAME | ARBITRARY MESSAGE |
|---|---|---|---|
| I | 0 | AAA | (NONE) |
| II | 1 | BBB | (NONE) |
| III | 2 | CCC | (NONE) |
| IV | 3 | DDD | (NONE) |
| V | 4 | EEE | (NONE) |
| VI | 0 | — | BE CAREFUL WITH A CLICK ON A LINK LIKE URL. |
| VII | 1 | GGG | THIS OPERATION COULD CAUSE AN ACCESS CHARGE. |
| VIII | 2 | HHH | (NONE) |
| IX | 3 | III | (NONE) |

| PROBLEM LEVEL | OPERATION PATTERN | FIXED MESSAGE |
|---|---|---|
| 0 | WARNING | FURTHER OPERATION CAN CAUSE A MALFUNCTION. |
| 1 | ABORT INQUIRY | FURTHER OPERATION CAN CAUSE A MALFUNCTION. DO YOU WANT TO ABORT THE OPERATION? |
| 2 | ABORT | THE OPERATION WAS ABORTED BECAUSE OF A POSSIBLE MALFUNCTION. |
| 3 | DELETION INQUIRY | FURTHER OPERATION CAN CAUSE A MALFUNCTION. DO YOU WANT TO DELETE THE DATA? |
| 4 | DELETION | FURTHER OPERATION CAN CAUSE A MALFUNCTION. THE DATA WAS DELETED. |

| PROBLEM PATTERN | PROBLEM LEVEL | DATA FORM | PROBLEM ELEMENT NAME | ARBITRARY MESSAGE |
|---|---|---|---|---|
| I | 0 | — | AAA | (NONE) |
| II | 1 | URL | — | YOU ARE ABOUT TO CONNECT TO %URL%. |
| II | 1 | MAIL ADDRESS | — | YOU ARE ABOUT TO TRANSMIT MAIL TO %Address%. |
| II | 1 | PHONE NUMBER | — | YOU ARE ABOUT TO CALL %Phone-number%. |
| III | 2 | — | CCC | (NONE) |

INFORMATION COMMUNICATION APPARATUS AND MESSAGE DISPLAYING METHOD

TECHNICAL FIELD

The present invention relates to an information communication apparatus and message displaying method for, when there is a problem in received data, displaying a fixed message corresponding to the problem in the received data.

BACKGROUND ART

In recent years there frequently arise such problems as the problem that an unwanted e-mail message is delivered to the information communication apparatus such as a cell phone or a PHS, the problem that a large amount is charged because of browsing of an Internet website managed by a malicious business, and the problem that data received by the information communication apparatus contains a computer virus. A variety of technologies have been developed heretofore in order to reduce such problems. For example, Patent Document 1 discloses the technology of preliminarily registering specific information of unwanted mail and, when incoming mail is the unwanted mail, automatically erasing the unwanted mail. Patent Document 2 discloses the technology of, if data received by the information communication apparatus is inappropriate, sending warning information to an originator. Furthermore, Patent Document 3 discloses the technology of sending only data whose security was confirmed, to a user terminal and displaying a fixed message indicating the security, on a display of the user terminal. In these conventional technologies, when there was a problem in data received by the information communication apparatus or the like, a patterned process was carried out according to the problem.

Patent Document 1: Japanese Patent Application Laid-Open Gazette No. 2002-335288

Patent Document 2: Japanese Patent Application Laid-Open Gazette No. 2004-236234

Patent Document 3: Japanese Patent Application Laid-Open Gazette No. 2002-290990

DISCLOSURE OF THE INVENTION

Problem to be Solved by the Invention

Incidentally, a wide variety of problems emerge with the widespread use of the information communication apparatus, and it is anticipated that there will arise new problems, e.g., a problem caused by provision of a new service by a malicious business. In the conventional technologies, however, the patterned process was fixed corresponding to each problem, and it was difficult to perform a flexible treatment, for example, in cases where a new problem emerges to give rise to a need for displaying a new message to call user's attention.

The present invention has been accomplished in order to solve the above problems, and an object of the invention is to provide an information communication apparatus and message displaying method which are able to perform a flexible treatment according to a problem in data received by the information communication apparatus.

Means for Solving the Problem

In order to solve the above problems, the present invention provides an information communication apparatus comprising: communication processing module for receiving data; problem determination storing module for storing problem finding information for determining whether there is a problem in the received data received by the communication processing module, in correspondence to a fixed message, and for storing an arbitrary message available for arbitrary correspondence to the problem finding information; arbitrary message determining module for, when it is determined that there is a problem in the received data, based on the problem finding information, determining whether the arbitrary message is stored in correspondence to the problem finding information in the problem determination storing module; and display controlling module for displaying the arbitrary message on display module when the arbitrary message determining module determines that the arbitrary message is stored in correspondence to the problem finding information, and for displaying the fixed message stored in correspondence to the problem finding information in the problem determination storing module, on the display module when the arbitrary message determining module determines that the arbitrary message is not stored in correspondence to the problem finding information.

The present invention also provides a message displaying method comprising: a problem determination step of determining whether there is a problem in received data, based on problem finding information stored in problem determination storing module for storing the problem finding information for determining whether there is a problem in received data received by an information communication apparatus, in correspondence to a fixed message and for storing an arbitrary message available for arbitrary correspondence to the problem finding information; an arbitrary message determination step of determining whether the arbitrary message is stored in correspondence to the problem finding information in the problem determination storing module, when it is determined in the problem determination step that there is a problem in the received data; and a message display step of displaying the arbitrary message when it is determined in the arbitrary message determination step that the arbitrary message is stored in correspondence to the problem finding information, and displaying the fixed message stored in correspondence to the problem finding information in the problem determination storing module, when it is determined that the arbitrary message is not stored in correspondence to the problem finding information.

In the above-described information communication apparatus and message displaying method, the fixed message is displayed on the display module when the arbitrary message is not stored in correspondence to the problem finding information in the problem determination storing module; the arbitrary message is displayed instead of the fixed message on the display module when the arbitrary message is stored in correspondence to the problem finding information. This arbitrary message is available for arbitrary correspondence to the problem finding information used in determining whether there is a problem in the received data. For this reason, when a new problem arises about received data, an arbitrary message can be made in correspondence to the problem finding information stored in the problem determination storing module, without change in the fixed message, so as to enable a flexible treatment.

Preferably, the problem determination storing module comprises problem pattern storing module for storing the problem finding information in correspondence to a plurality of problem levels classified according to levels of importance of the problem finding information and for storing an arbitrary message available for an update, in arbitrary correspondence to the problem finding information, and problem level storing module for storing each problem level in correspondence to the fixed message; the arbitrary message determining module determines whether the arbitrary message is stored in correspondence to the problem finding information in the problem pattern storing module, when it is determined that there is a problem in the received data, based on the problem finding information stored in the problem pattern storing module; the display controlling module displays the arbitrary message on the display module when the arbitrary message determining module determines that the arbitrary message is stored in correspondence to the problem finding information, and the display controlling module displays the fixed message stored in the problem level storing module in correspondence to the problem level stored in correspondence to the problem finding information in the problem pattern storing module, on the display module, when it is determined that the arbitrary message is not stored in correspondence to the problem finding information.

In this information communication apparatus, problems of received data are classified according to the plurality of problem levels classed according to levels of importance of the problem finding information (e.g., levels of influence on the information communication apparatus or damage to the user, or the like), and a fixed message according to a problem level is displayed with a problem in received data. Furthermore, the problem pattern storing module for storing the arbitrary message is separated from the problem level storing module for storing the fixed message, whereby the correspondence between the problem finding information and the arbitrary message can be readily changed by an update of the problem pattern storing module, which enables a flexible treatment.

The aforementioned display controlling module is desirably configured as follows: upon display of the arbitrary message on the display module, the display controlling module determines whether the arbitrary message contains embedded information; when the arbitrary message contains the embedded information, the display controlling module replaces the embedded information in the arbitrary message with information pertinent to the embedded information in the received data, and displays the arbitrary message after the replacement on the display module. The "embedded information" herein is, for example, information such as a URL, mail address, or telephone number, and, as shown in the example of the arbitrary messages of FIG. 8, an example of the embedded information is an embodiment in which it is embedded in the form of "%-%" in an arbitrary message. In this way, the information such as a URL, mail address, or phone number in the received data is allowed to be embedded in the arbitrary message, and it becomes feasible to form an appropriate arbitrary message according to the content of the received data and to display it on the display module.

Preferably, the information communication apparatus further comprises arbitrary message update processing module for performing addition or deletion of the problem finding information to or from the problem pattern storing module of the information communication apparatus, and for performing addition, deletion, or change of the arbitrary message corresponding to the problem finding information.

With a new problem, this information communication apparatus, having the update processing module, is able to add the problem finding information corresponding to the new problem to the problem pattern storing module and further to add the arbitrary message corresponding to the newly added problem finding information. In addition, when the problem finding information already stored in the problem pattern storing module becomes out-of-date, the problem finding information can be deleted. Furthermore, an arbitrary message can be deleted and the content thereof can be changed, thus enabling a flexible treatment.

Preferably, the foregoing information communication apparatus further comprises action controlling module for, when it is determined that there is a problem in the received data, based on the problem finding information, performing an operation process according to the problem level stored in correspondence to the problem finding information in the problem pattern storing module. Since the information communication apparatus comprises the action controlling module, it is able to appropriately perform the operation process according to the problem level, e.g., an operation process such as deletion of received data or transmission of data for warning to an originator.

Preferably, the foregoing information communication apparatus further comprises originator information storing module for storing originator information contained in the received data, the originator information being information permitting confirmation of security of the received data; and a problem determination processor for, when the originator information contained in the received data received by the communication processing module matches up with the originator information stored in the originator information storing module, determining that there is no problem in the received data.

Preferably, the foregoing message displaying method further comprises a problem determination avoidance step of, upon reception of the received data, determining that there is no problem in the received data, without execution of the problem determination step, when originator information contained in the received data matches up with originator information stored for confirmation of security in originator information storing module.

The foregoing message displaying method is desirably configured so that the message display step comprises the following steps: upon display of the arbitrary message, it is determined whether the arbitrary message contains embedded information; and when the arbitrary message contains the embedded information, the embedded information in the arbitrary message is replaced with information pertinent to the embedded information in the received data, and the arbitrary message after the replacement is displayed. As shown in the example of the arbitrary messages of FIG. 8, an example of the embedded information is an embodiment in which it is embedded in the form of "%-%" in the arbitrary message. In this manner, the information such as a URL, mail address, or phone number in the received data is allowed to be embedded in the arbitrary message, and it thus becomes feasible to form and display an appropriate arbitrary message according to the content of the received data.

Since the information communication apparatus and message displaying method are configured to determine that there is no problem in the received data, based on the originator information of the received data, with reference to the originator information storing module for storing the originator information permitting confirmation of security, there is no need for determining whether there is a problem, with reference to the problem pattern storing module for every received data, whereby the processing necessary for determination on whether there is a problem in the received data is efficiently carried out and the load for the processing is reduced.

Effect of the Invention

The present invention provides the following effect: when there is a problem in data received by the information communication apparatus, a flexibly treatment is performed according to the problem.

DESCRIPTION OF REFERENCE SYMBOLS

1 is for cell phone (information communication apparatus); 2 is for radio communicator (communication processing module); 3 is for problem determination storage (problem determination storing module); 31 is for problem pattern storage (problem pattern storing module); 32 is for problem level storage (problem level storing module); 4 is for problem determination processor (problem determination processing module); 5 is for arbitrary message determination processor (arbitrary message determining module); 6 is for operation controller (display controlling module, action controlling module); 7 is for display (display module); 9 is for originator information storage (originator information storing module); 10 is for update processor (update processing module).

BEST MODE FOR CARRYING OUT THE INVENTION

Preferred embodiments of the present invention will be described below with reference to the accompanying drawings. The same elements will be denoted by the same reference symbols throughout the description of the drawings, without redundant description.

First Embodiment

Figure 1:
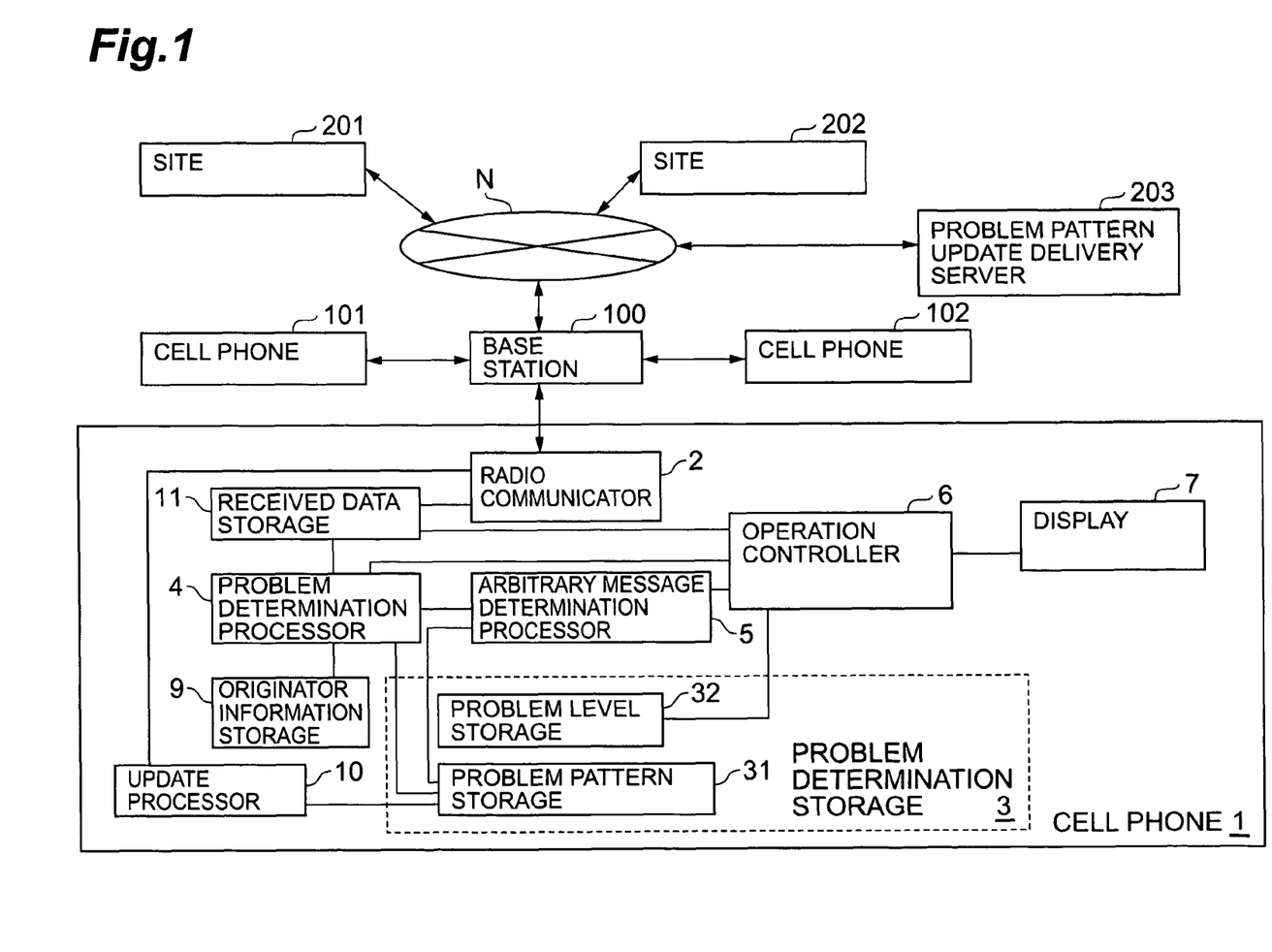
FIG. 1 is a block diagram of a cell phone according to first and second embodiments, and drawing showing other information communication apparatuss connected through a network to this cell phone.

As shown in FIG. 1, cell phone 1 is an embodiment of the information communication apparatus according to the present invention, is connectable through base station 100 to network N, and is adapted to access a site 201, 202 through the network N and download data available for output in the cell phone 1, from the site 201, 202. The cell phone 1 accesses after-mentioned problem pattern update delivery server 203 through the network N and downloads an update for updating after-mentioned problem pattern table 301 from the problem pattern update delivery server 203. The cell phone 1 is also connectable through base station 100 to other cell phones 101, 102, for example, to transmit and receive e-mail messages. Here the sites 201, 202 are, for example, Web servers for providing various contents. The network N is, for example, a mobile communication network or an Internet network. The output in the cell phone 1 embraces those that can be recognized by user's visual sensation and auditory sensation, e.g., reproduction of video data and audio data as well as character data and image data.

The cell phone 1 is physically equipped with a CPU (central processing unit), a memory (storage device), a modem (communication device), operation buttons, a liquid crystal display, a speaker, and so on. The cell phone 1 is functionally composed of the following elements: radio communicator 2 (communication processing module), problem determination storage 3 (problem determination storing module), problem determination processor 4 (problem determination processing module), arbitrary message determination processor 5 (arbitrary message determining module), operation controller 6 (display controlling module, action controlling module), display 7 (display module), originator information storage 9 (originator information storing module), update processor 10 (update processing module), and received data storage 11.

The radio communicator 2 conducts connection and communication with the network N through base station 100 constituting a cell phone network. The radio communicator 2 also conducts connection and communication with another cell phone 101, 102 through base station 100. The radio communicator 2 performs downloading of data and acquisition of data about communication, or transmission of data. Received data acquired by the radio communicator 2 is stored into received data storage 11.

The problem determination storage 3 is provided with problem pattern storage 31 (problem pattern storing module) and problem level storage 32 (problem level storing module). Problem pattern table 301 (cf. FIG. 3) stored in the problem pattern storage 31 is updated based on an update downloaded from the problem pattern update delivery server 203. On the other hand, problem level table 302 (cf. FIG. 4) stored in the problem level storage 32 is set so as not to be updatable.

Figure 3:
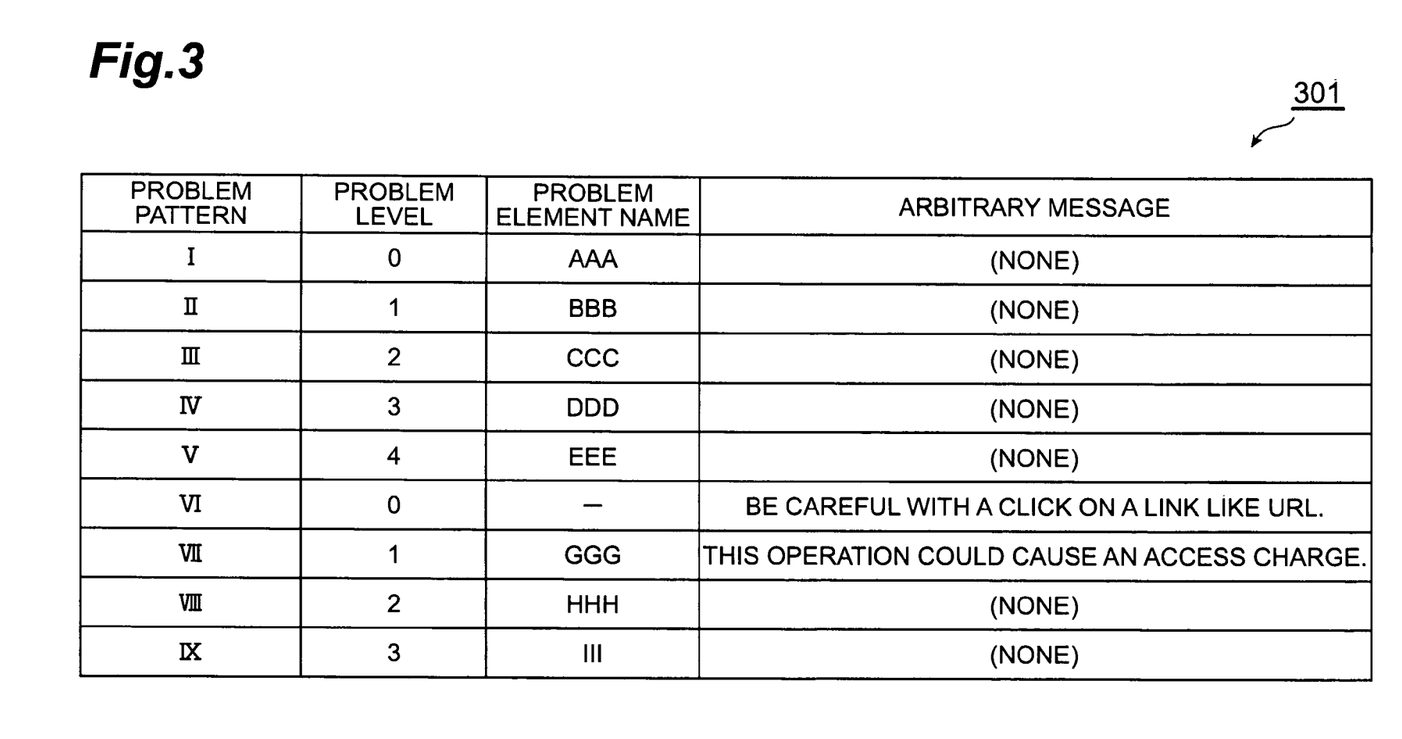
FIG. 3 is a drawing showing an example of a problem pattern table in the first embodiment.

As shown in FIG. 3, the problem pattern table 301 stored in the problem pattern storage 31 stores as problem patterns, problem finding information used in determination on whether there is a problem in received data.

The problems about received data herein generally mean the problem that the user of cell phone 1 feels uncomfortable, or that the user is likely to feel uncomfortable, the problem that the user suffers economical damage, or that the user is highly likely to suffer economical damage, and so on. For example, such problems include e-mail messages directly connected with frauds such as unwanted e-mail and one-ring phone scams, display of images including sexual contents or violent contents, and so on. The problem finding information refers, for example, to specific data, a program sequence, etc. included in received data having a problem, and is, specifically, a descriptor in an HTML, a cell phone number, a domain name in an address, image data, and so on. A plurality of problem patterns stored in the problem pattern table are pieces of problem finding information different from each other and can be discriminated from each other. In the present embodiment, pieces of problem finding information from I to IX are stored as problem patterns. If received data contains specific data matching up with any one of the problem finding information pieces, or if received data contains a program that performs processing substantially identical with a program being one of the problem finding information pieces, aftermentioned problem determination processor 4 determines that there is a problem in the received data.

The problem pattern table 301 stores a plurality of problem levels classified according to levels of importance of the problem finding information, in correspondence to the problem finding information. The levels of importance of the problem finding information herein are, for example, degrees of hindrance to the cell phone 1, levels of economical damage to the user (amounts of damage), frequencies of occurrence of problem, degrees of offending against public order and morals, and so on, and are stored in five separate stages from "0" to "4"; "0" is the lowest to cause the lowest level of influence on or damage to the cell phone 1, and "4" is the highest.

The problem pattern table 301 stores problem element names for identifying the problems in received data, in arbitrary correspondence to the problem finding information. The problem element names herein are, for example, computer virus names, malicious business names, and so on. In the present embodiment, there is no problem element name corresponding to the problem finding information VI, and thus the problem element name corresponding to the problem finding information VI is omitted.

The problem pattern table 301 also stores arbitrary messages that can be arbitrarily set in correspondence to the problem finding information. The phrase "that can be arbitrarily set in correspondence" herein means that an arbitrary message is freely set in correspondence to all or some of the problem finding information pieces. An arbitrary message is information for displaying a content that should be particularly notified to the user, for each problem finding information, on the display 7. In the present embodiment, arbitrary messages are set in correspondence to only pieces of problem finding information VI, VII; an arbitrary message of "Be careful with a click on a link like URL". is stored in correspondence to the problem finding information VI; an arbitrary message of "This operation could cause an access charge". is stored in correspondence to the problem finding information VII.

Figure 4:
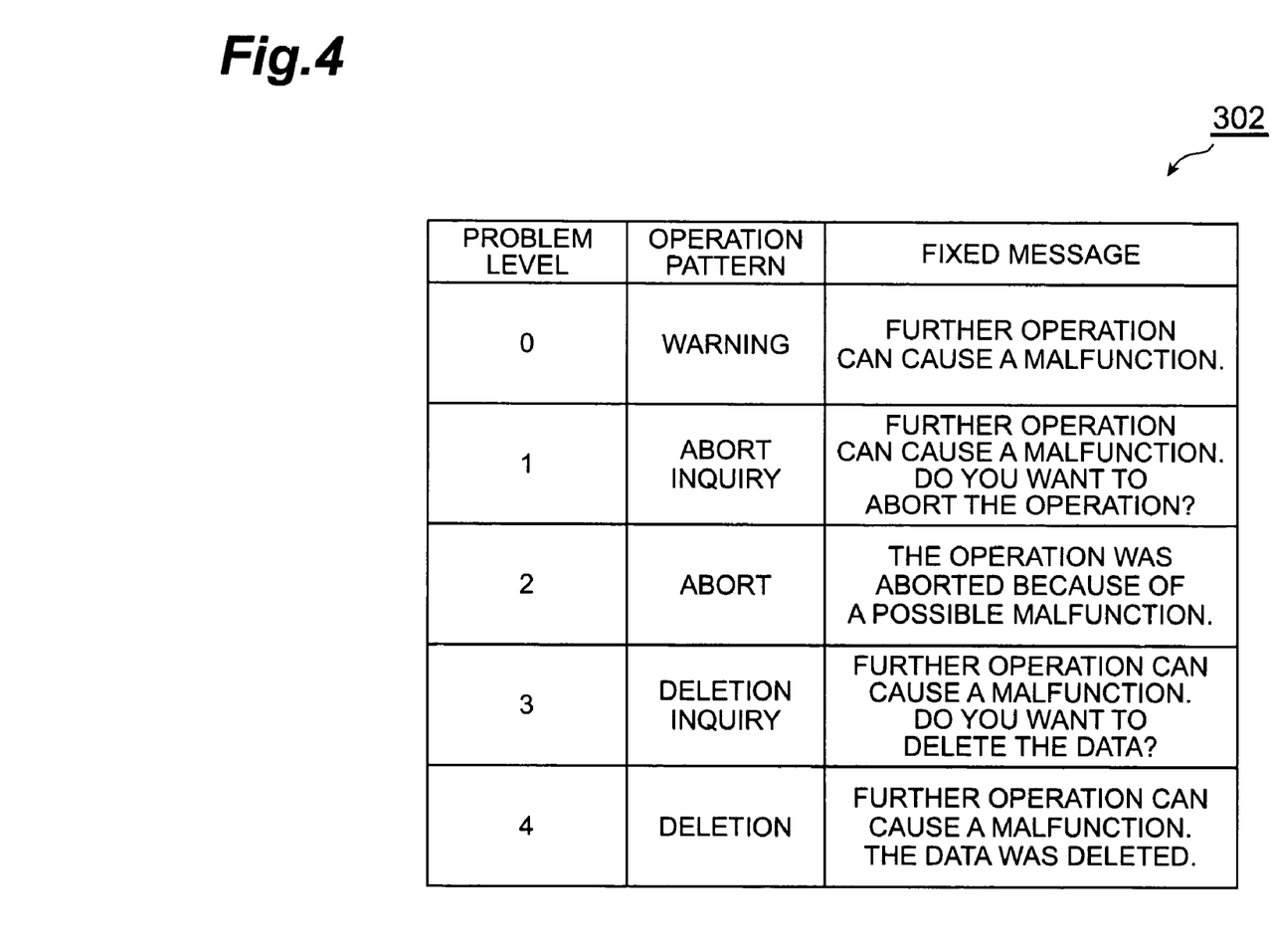
FIG. 4 is a drawing showing an example of a problem level table.

As shown in FIG. 4, the problem level table 302 stored in the problem level storage 32 stores problem levels corresponding to the problem levels stored in the problem pattern storage 31. The problem level table 302 also stores operation patterns of cell phone 1 in correspondence to the problem levels, and fixed messages in correspondence to the problem levels.

The operation patterns of cell phone 1 refer to modes of processing executed according to the problem levels in cell phone 1. In the present embodiment, the operation patterns of "warning", "abort inquiry", "abort", "deletion inquiry", and "deletion" are stored in correspondence to the problem levels "0" to "4". Here the "warning" and "abort inquiry" refer to processes to call user's attention by display or voice guidance of a fixed message. Furthermore, the "abort" refers to a process to abort activation of a program included in received data; the "deletion inquiry" to a process to inquire of the user as to deletion of downloaded data by a fixed message or voice guidance; and the "deletion" to a process to delete downloaded data without inquiry to the user.

The fixed messages are information for displaying contents that have to be notified to the user, according to the problem levels, on the display 7, and fixed contents are determined for them in association with the operation patterns. In the present embodiment, a fixed message of "Further operation can cause a malfunction". is stored in association with the operation pattern "warning". Similarly, a fixed message of "Further operation can cause a malfunction. Do you want to abort the operation?" is stored in association with the operation pattern "abort inquiry"; a fixed message of "The operation was aborted because of a possible malfunction". in association with the operation pattern "abort"; a fixed message of "Further operation can cause a malfunction. Do you want to delete the data?" in association with the operation pattern "deletion inquiry"; and a fixed message of "Further operation can cause a malfunction. The data was deleted". in association with the operation pattern "deletion".

As shown in FIG. 1, the problem determination processor 4 determines whether there is a problem in the received data acquired by the radio communicator 2. Here the problem determination processor 4 determines whether there is a problem in the received data stored in the received data storage 11, based on the problem finding information of the problem pattern table 301 stored in the problem pattern storage 31. Furthermore, the problem determination processor 4 acquires a problem level corresponding to the problem finding information as a basis for a problem in the received data (which will be referred to hereinafter as matching problem information). The problem determination processor 4 references originator information stored in the originator information storage 9 and, when the originator information in the received data matches up with any one of the originator information stored in the originator information storage 9, it determines that there is no problem in the received data.

When the problem determination processor 4 determines that there is a problem in the received data, the arbitrary message determination processor 5 determines whether an arbitrary message corresponding to the matching problem information is stored in the problem pattern storage 31. When an arbitrary message is stored, the arbitrary message determination processor 5 acquires the arbitrary message.

The operation controller 6 operates as a display controlling module and, when the arbitrary message determination processor 5 determines there is an arbitrary message stored, the operation controller 6 outputs the arbitrary message acquired by the arbitrary message determination processor 5, to the display 7 consisting of a liquid crystal display, to display the arbitrary message on the display 7. When the arbitrary message determination processor 5 determines that no arbitrary message is stored, the operation controller 6 references the problem level storage 32 to acquire a fixed message on the basis of the problem level acquired by the problem determination processor 4, and outputs the fixed message to the display 7 to display it on the display 7.

The operation controller 6 also operates as an action controlling module and references the problem level storage 32 to acquire an operation pattern of cell phone 1 on the basis of the problem level acquired by the problem determination processor 4. Then the operation controller 6 performs a process for letting the cell phone 1 carry out the predetermined operation, according to the acquired operation pattern. For example, it outputs a sound to call user's attention, from the unrepresented speaker, or deletes the received data stored in the received data storage 11. Furthermore, the operation controller 6 also performs an output process based on the received data, for example, to display an image or to reproduce audio data.

The display 7 displays information fed from the operation controller 6, e.g., an arbitrary message or a fixed message, or image data based on the received data.

Figure 6:
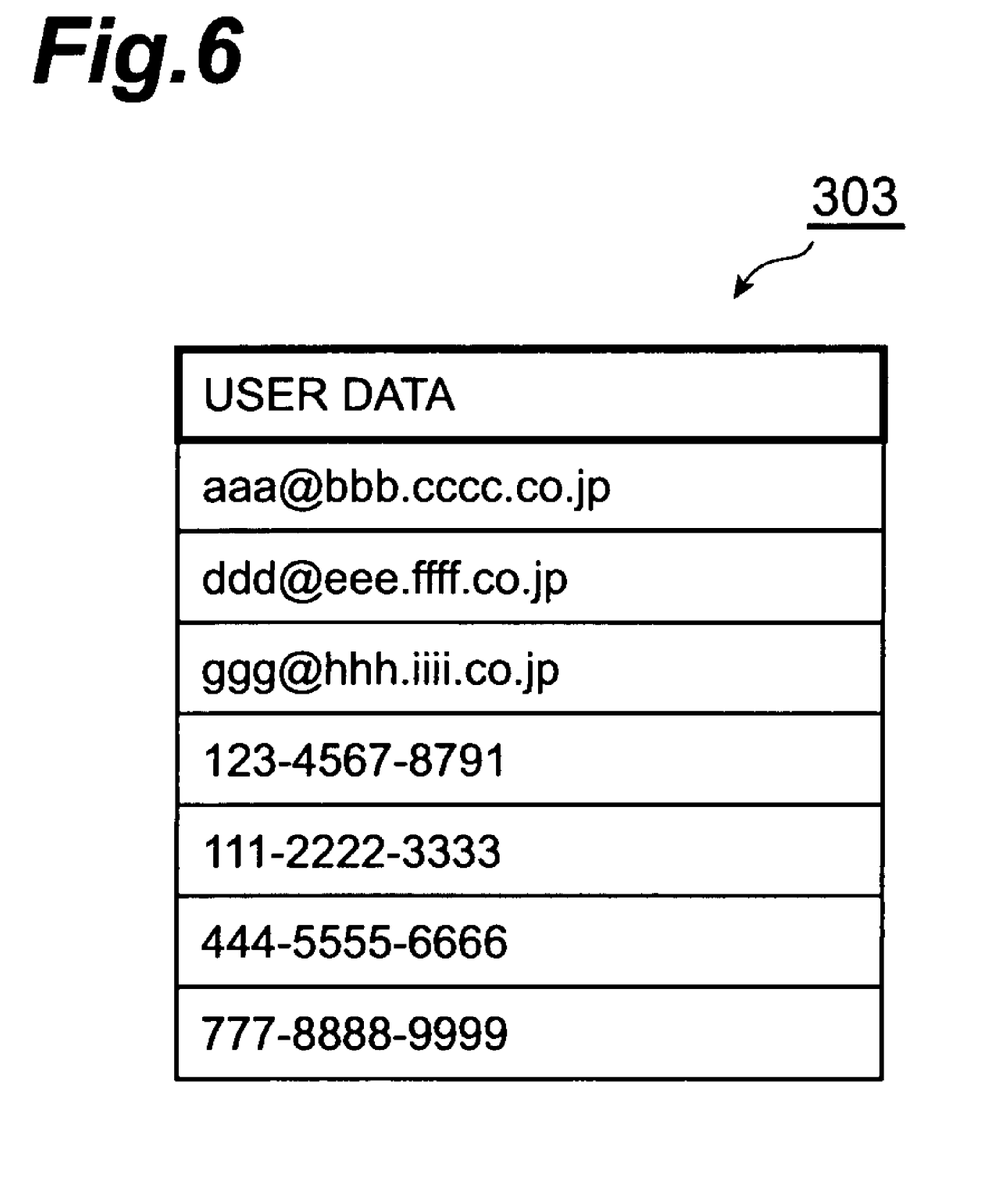
FIG. 6 is a drawing showing an example of a user data table.

The originator information storage 9, as shown in FIG. 6, has user data table 303 and stores originator information that permits confirmation of security of received data. The originator information herein is information that is contained in received data and that permits confirmation of an originator of received data, and embraces, for example, a mail address, a telephone number, or the like. The phrase "that permits confirmation of security of received data" means that it can be presumed that the received data is unlikely to cause the user to feel uncomfortable or to suffer damage, and, for example, a mail address, a phone number, or the like registered by a user is equivalent to the originator information that permits confirmation of security of received data.

The update processor 10 updates the problem pattern table 301 stored in the problem pattern storage 31, based on an update sent from the problem pattern update delivery server 203. Here the update processor 10 performs addition or deletion of problem finding information to or from the problem pattern table 301, addition or change of a problem level corresponding to the problem finding information, or addition, deletion, or change of an arbitrary message corresponding to the problem finding information. The update operation of problem pattern table 301 executed by the update processor 10 may be carried out based on updates transmitted at regular intervals (e.g., once per month or once per week) from the problem pattern update delivery server 203. The update operation may be carried out at irregular intervals on the basis of updates returned from the problem pattern update delivery server 203 in response to transmission of update requests to the problem pattern update delivery server 203 based on user's manipulation on the operation buttons (not shown) of cell phone 1.

The received data storage 11 stores the received data acquired by the radio communicator 2. The received data stored in the received data storage 11 is deleted by the operation controller 6.

The following will describe the problem pattern update delivery server 203. As shown in FIG. 1, the problem pattern update delivery server 203 transmits to the cell phone 1, an update for updating the problem pattern table 301 stored in the problem pattern storage 31 of cell phone 1. When a new problem emerges, e.g., when there arises a problem due to a new service by a malicious business, the problem pattern update delivery server 203 transmits to cell phone 1 an update to add the problem finding information, the problem level, the arbitrary message, etc. corresponding to the problem. Such update transmission may be carried out at regular intervals or at irregular intervals upon every emergence of a new problem, and may also be carried out upon reception of an update request from cell phone 1.

Figure 2:
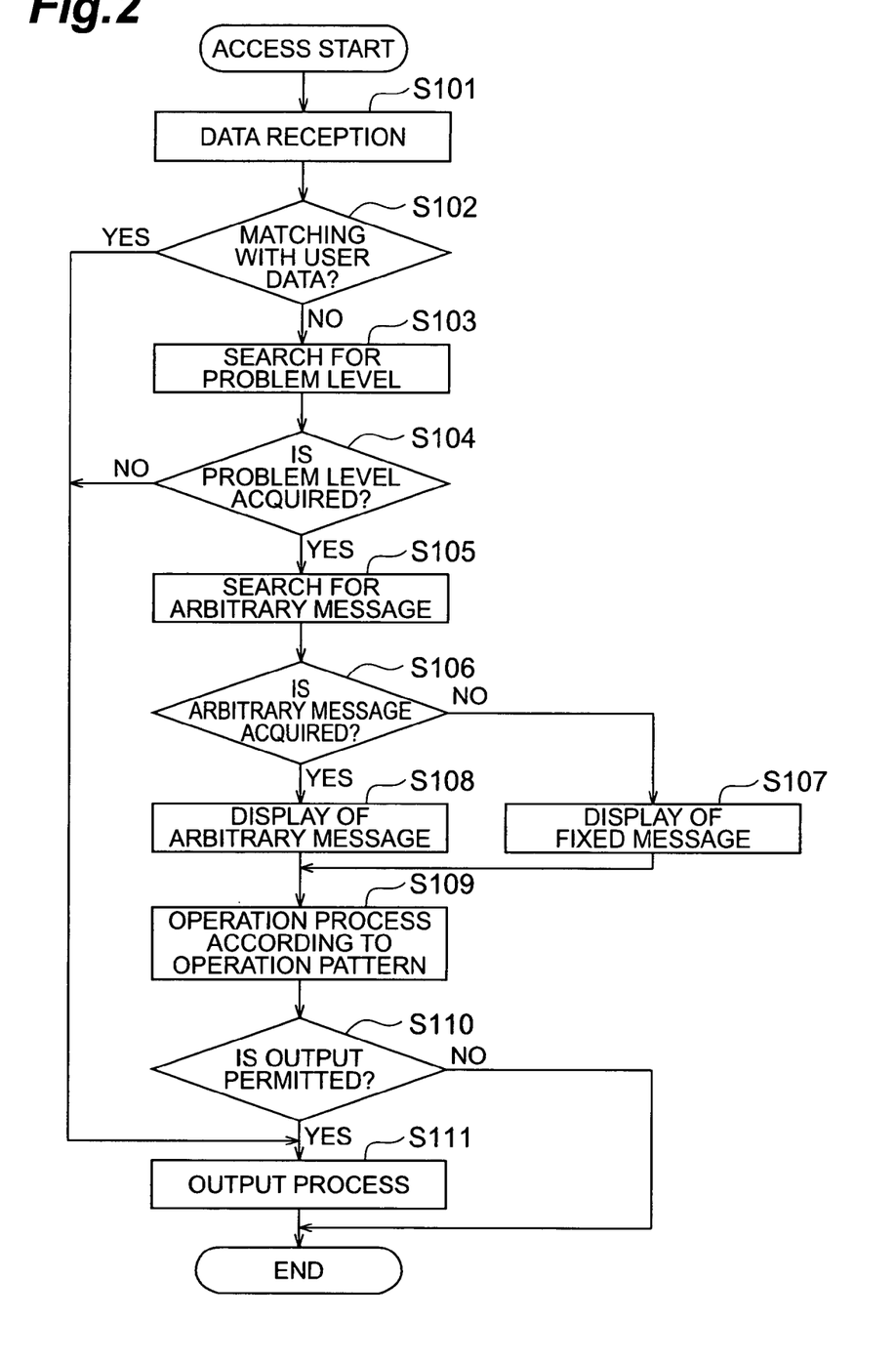
FIG. 2 is a flowchart showing an operational procedure in the first embodiment.

Subsequently, the operation of cell phone 1 will be described with focus on a message displaying method being an embodiment of the present invention. FIG. 2 is a flowchart showing the operation of cell phone 1.

When cell phone 1 starts access and receives data from another information communication apparatus (site 201, 202, or cell phone 101, 102), the radio communicator 2 of cell phone 1 acquires the received data and stores the data into the received data storage 11 (S101). Thereafter, the problem determination processor 4 acquires the originator information included in the received data. Then the problem determination processor 4 executes a problem determination avoidance step (S102) to determine whether it is necessary to determine a problem in the received data, with reference to the user data table 303 stored in the originator information storage 9. In the problem determination avoidance step (S102) the problem determination processor 4 determines whether the originator information acquired from the received data matches up with any one of the originator information stored in the user data table 303, and when a match is found, the problem determination processor 4 determines that there is no problem in the received data; when no match is found, the problem determination processor 4 determines that it is necessary to determine a problem in the received data.

The problem determination processor 4, which determined in step S102 that it was necessary to determine a problem in the received data, references the problem pattern table 301 stored in the problem pattern storage 31, to retrieve a problem level (S103). For example, the problem determination processor 4 determines whether the problem pattern table 301 stores the problem finding information identical with specific data contained in the received data, and, when there is the identical problem finding information (matching problem information), it acquires the problem level and problem element name stored in correspondence to the matching problem information in the problem pattern table 301. For example, when specific information in the received data from the cell phone 101 matches up with the problem finding information I (cf. FIG. 3), the problem determination processor 4 acquires the problem level "0" and the problem element name "AAA". In another case, where specific information in the received data from the site 201 matches up with the problem finding information VI, the problem determination processor 4 acquires the problem level "0". In this case, the problem element name is omitted, and thus the problem determination processor 4 acquires no problem element name.

Subsequently, the problem determination processor 4 executes a problem determination step of determining whether there is a problem in the received data, based on the problem finding information (S104). When a problem level is acquired, the problem determination processor 4 determines that there is a problem in the received data; when no problem level is acquired, the problem determination processor 4 determines that there is no problem in the received data.

Subsequently, the arbitrary message determination processor 5 searches for an arbitrary message stored in correspondence to the matching problem information in the problem pattern storage 31 (S105). When the problem pattern storage 31 stores the arbitrary message corresponding to the matching problem information, the arbitrary message determination processor 5 acquires the arbitrary message. For example, when the matching problem information is the problem finding information VI, the arbitrary message determination processor 5 acquires the arbitrary message of "Be careful with a click on a link like URL". because the arbitrary message is stored in correspondence to the problem finding information VI.

Subsequently, the arbitrary message determination processor 5 executes an arbitrary message determination step (S106) of determining whether an arbitrary message is stored in correspondence to the matching problem information in the problem determination storage 3. When the arbitrary message is acquired in step S105, the arbitrary message determination processor 5 determines that the arbitrary message is stored in the problem determination storage 3; when no arbitrary message is acquired, the arbitrary message determination processor 5 determines that no arbitrary message is stored in the problem determination storage 3.

Figure 5:
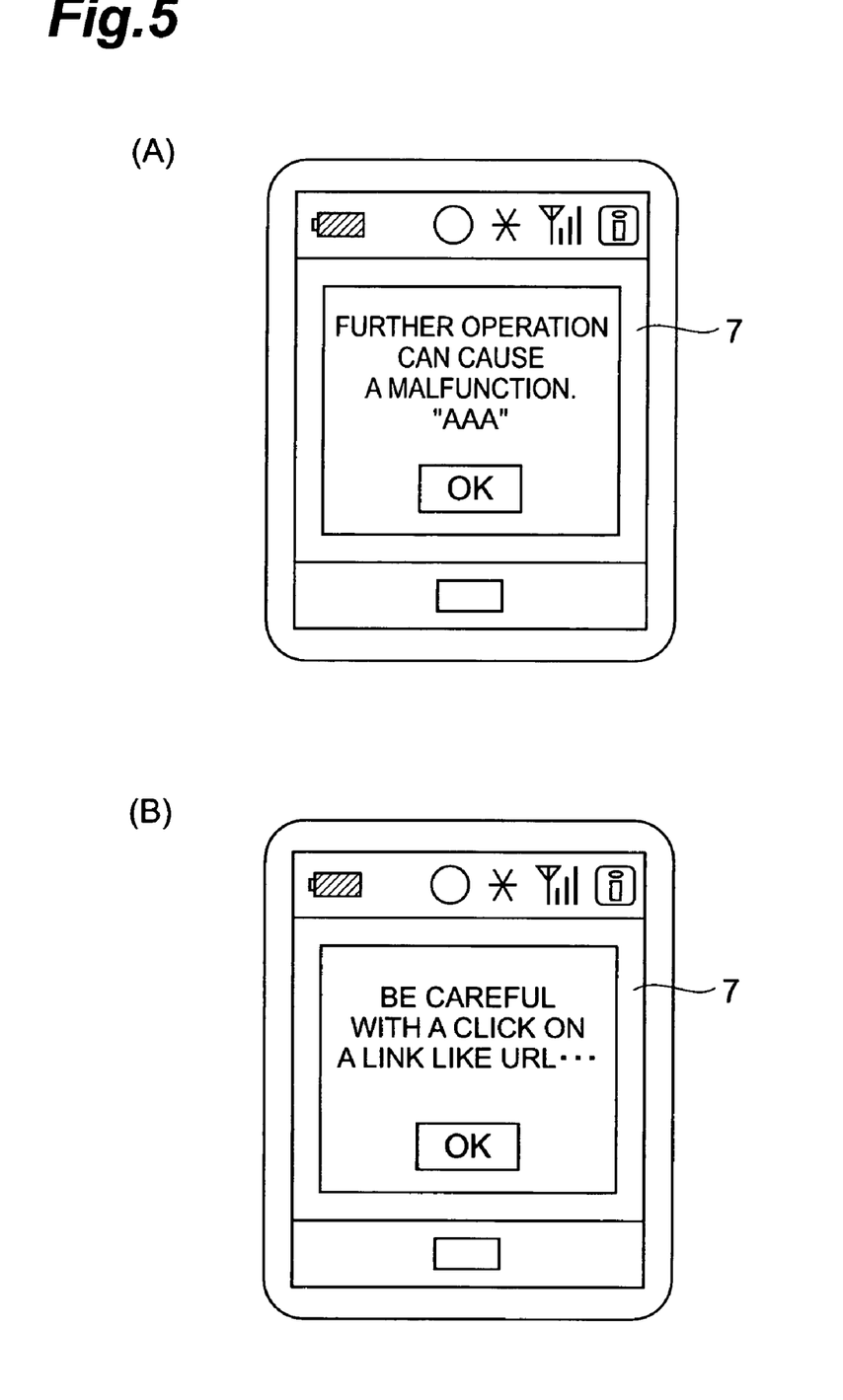
FIG. 5 is a drawing to illustrate a fixed message and an arbitrary message displayed on a display.

When the arbitrary message determination processor 5 determines in step S106 that no arbitrary message is stored, the operation controller 6 references the problem level table 302 (cf. FIG. 4) stored in the problem level storage 32, to acquire a fixed message corresponding to the problem level acquired in step S103 by the problem determination processor 4. For example, when the acquired problem level is "0", the problem determination processor 4 acquires the fixed message "Further operation can cause a malfunction". Then the operation controller 6 outputs the acquired fixed message to the display 7 to display the fixed message on the display 7 (S107). Furthermore, when the problem determination processor 4 acquires the problem element name, the operation controller 6 also outputs the acquired problem element name to the display 7 to display the fed problem element name on the display 7. For example, when the matching problem information is the problem finding information I, the fixed message "Further operation can cause a malfunction". and the problem element name "AAA" are displayed on the display 7, as shown in FIG. 5 (A).

On the other hand, when the arbitrary message determination processor 5 determines in step S106 that the arbitrary message is stored, the operation controller 6 outputs the arbitrary message acquired by the arbitrary message determination processor 5, to the display 7 to display the arbitrary message on the display 7 (S108). For example, when the matching problem information is the problem finding information VI, the arbitrary message "Be careful with a click on a link like URL". is displayed as shown in FIG. 5(B).

Subsequently, the operation controller 6 references the problem level table 302 (cf. FIG. 4) stored in the problem level storage 32, to acquire the operation pattern of cell phone 1 corresponding to the problem level acquired in step S103 by the problem determination processor 4. For example, when the acquired problem level is "3", the operation controller 6 acquires the operation pattern "deletion inquiry". Then the operation controller 6 performs an operation process for letting the cell phone 1 operate according to the acquired operation pattern of cell phone 1 (S109). For example, in a case where the operation pattern is "deletion inquiry" and where no corresponding arbitrary message is stored, the fixed message "Further operation can cause a malfunction. Do you want to delete the data?" is displayed on the display 7 in step S107. When a signal to order deletion of the received data is entered by user's manipulation and fed to the operation controller 6, the operation controller 6 erases the received data stored in the received data storage 11, in step S109.

Subsequently, the operation controller 6 displays on the display a message for inquiring of the user as to permission of output such as display of an image or reproduction of a music corresponding to the received data (S110), and when data to permit the output is entered by user's manipulation, or when the problem determination processor 4 determines in step S102 or in step S104 that there is no problem in the received data, the operation controller 6 performs the output process (S111). The output process is to display character data or image data corresponding to the received data, to reproduce video data or music data, or the like, and the sequential processing is completed.

The following will describe the action and effect of the cell phone 1 and message displaying method. In cell phone 1, the arbitrary messages to be displayed upon finding of a problem are included in the problem pattern table 301 to be referenced for finding of a problem, whereby the cell phone is able not only to display a fixed message according to the problem of the received data but also to display an arbitrary message instead of the fixed message. For this reason, it becomes feasible to flexibly deal with various problems newly emerging in future.

In cell phone 1, the problems of received data are classified by the plurality of problem levels classed according to levels of importance of the problem finding information, and the fixed messages according to the problem levels are displayed corresponding to the problems of received data. Since the problem pattern storage 31 storing the arbitrary messages is provided separately from the problem level storage 32 storing the fixed messages, the correspondence between the problem finding information and the arbitrary messages can be readily changed by updates of the problem pattern storage 31, which enables a flexible treatment.

Furthermore, since cell phone 1 has the update processor 10, when a new problem arises, it is able to add the problem finding information corresponding to the new problem, to the problem pattern table 301 of the problem pattern storage 31 and further to add an arbitrary message corresponding to the newly added problem finding information. When the problem finding information already stored in the problem pattern storage 31 becomes out-of-date, the problem finding information can also be deleted. Furthermore, an arbitrary message can be deleted and the content thereof can also be changed, which enables a flexible treatment.

When the problem determination processor 4 of cell phone 1 determines that there is a problem in the received data, based on the problem finding information, it acquires the problem level stored in correspondence to the problem finding information in the problem pattern storage 31. Then the operation controller 6 performs the operation process according to the problem level acquired by the problem determination processor 4. For this reason, the operation controller 6 is able to properly perform the operation process according to the level of importance of the problem in the received data, e.g., an operation process such as deletion of the received data, transmission of data for warning to an originator, and so on.

The problem determination processor 4 of cell phone 1 executes the problem determination avoidance step of determining that there is no problem in the received data, from the originator information of the received data with reference to the user data table 303 of the originator information storage 9 storing the originator information permitting confirmation of security. For this reason, using the originator information stored in the user data table 303, the received data permitting confirmation of security on the basis of the originator information can be excluded from objects for determination of problem, which enhances the efficiency of the processing for determining whether there is a problem in received data, and thus reduces the load for the processing.

Second Embodiment

The second embodiment below will describe an embodiment wherein upon display of an arbitrary message, it is determined whether the arbitrary message contains embedded information and wherein when the arbitrary message contains embedded information, the embedded information in the arbitrary message is replaced with information pertinent to the embedded information in the received data and the arbitrary message after the replacement is displayed.

A block diagram of the cell phone according to the second embodiment is the same as the aforementioned block diagram of FIG. 1. In FIG. 1, the operation controller 6 acting as the display controlling module according to the present invention has the following function: upon display of an arbitrary message, it determines whether the arbitrary message contains embedded information; when the arbitrary message contains embedded information, the embedded information in the arbitrary message is replaced with information pertinent to the embedded information in the received data, and the arbitrary message after the replacement is displayed on the display 7.

Figure 8:
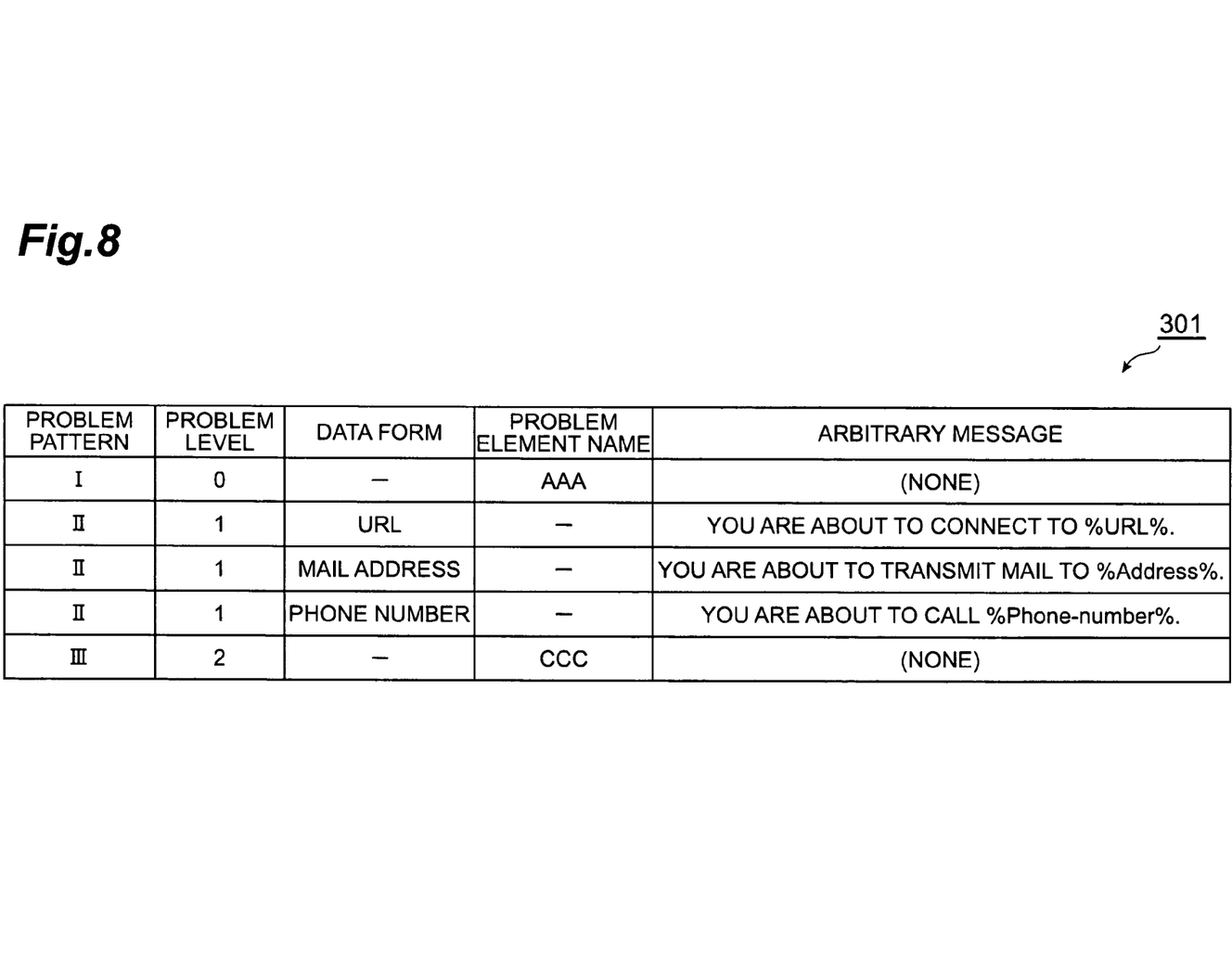
FIG. 8 is a drawing showing an example of a problem pattern table in the second embodiment.

In the problem pattern table 301 in the second embodiment, as shown in FIG. 8, for example, information such as a URL, a mail address, a telephone number, or the like is allowed to be embedded in the form of "%-%" in an arbitrary message. There is the column of "data form" in the problem pattern table 301, and this "data form" column permits discrimination among types of embedded information (e.g., the URL, mail address, telephone number, or the like). When the arbitrary message contains the embedded information, the operation controller 6 discriminates a type of the embedded information, based on the "data form" column, replaces the embedded information in the arbitrary message with information pertinent to the type in the received data, and displays the arbitrary message after the replacement on the display 7. However, if there is no information pertinent to the type in the received data, the operation controller 6 replaces the embedded information in the arbitrary message with default information about the type (e.g., a "given WEB site" for a URL, or the like) and displays the arbitrary message after the replacement on the display 7.

It is noted that the "data form" column is not always essential in the problem pattern table 301, and the type of the embedded information may also be discriminated according to a character string between "%" and "%" in the embedded information. For example, another potential discrimination method is as follows: when the character string between "%" and "%" is "URL", the type of embedded information is discriminated as "URL"; when the character string between "%" and "%" is "Address", the type of the embedded information is discriminated as "mail address".

Figure 7:
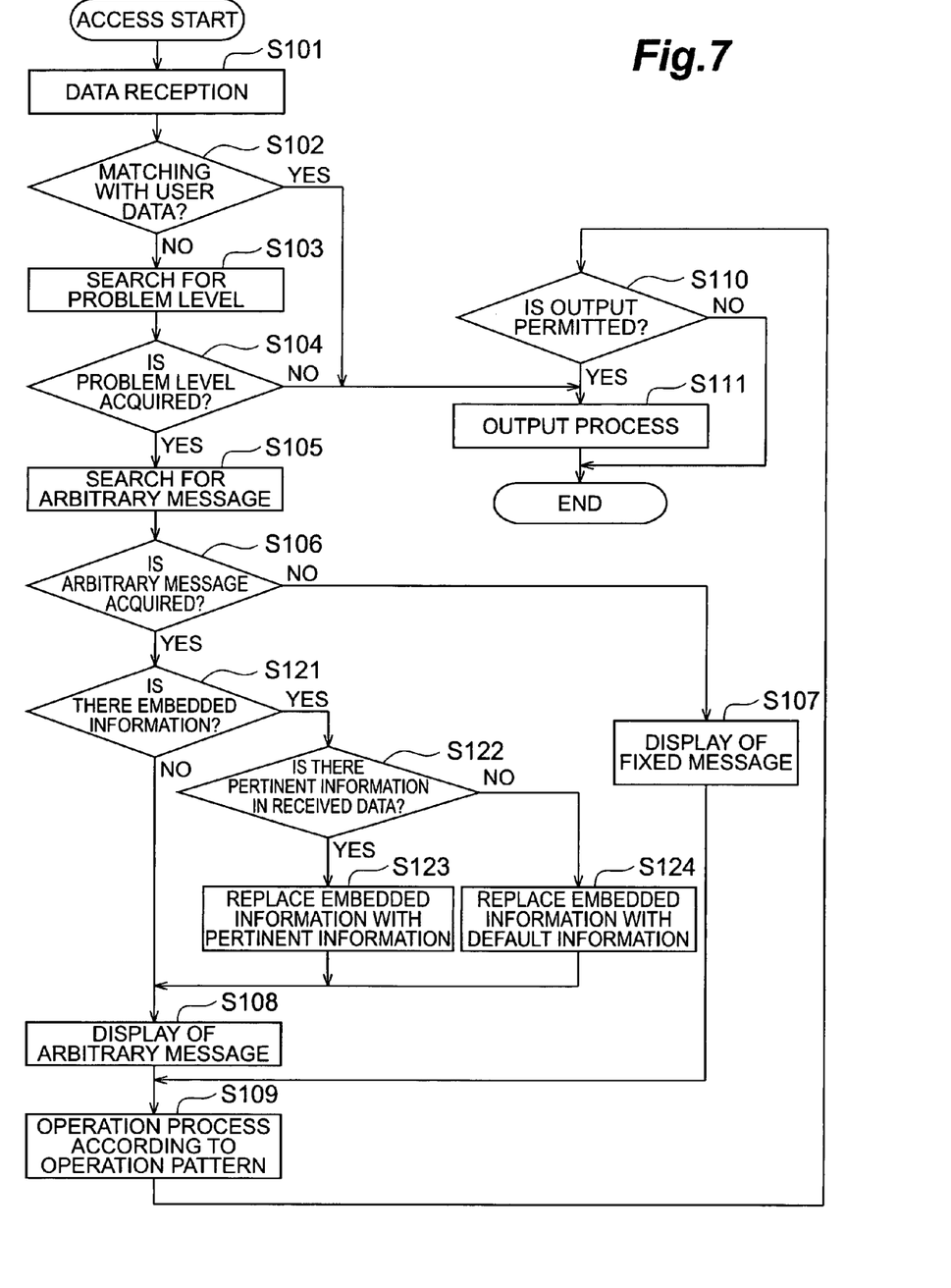
FIG. 7 is a flowchart showing an operational procedure in the second embodiment.

The following will describe the processing operation in the second embodiment with reference to FIG. 7. Since the processing operation in the second embodiment is different in addition of processes of steps S121-S124 from the aforementioned processing operation of the first embodiment (FIG. 2), only the difference will be described below, while omitting the other description.

When the arbitrary message determination processor 5 determines in step S106 that an arbitrary message is stored, the operation controller 6 determines whether the arbitrary message acquired by the arbitrary message determination processor 5 contains a character string between "%" and "%", whereby it determines whether the arbitrary message contains embedded information (S121). When the arbitrary message contains no embedded information, the operation controller moves to step S108; when the arbitrary message contains embedded information, the operation controller 6 determines in step S122 whether the received data contains information pertinent to the embedded information. Specifically, the operation controller 6 discriminates a type of the embedded information by the "data form" column corresponding to the arbitrary message, and determines whether information pertinent to the type is present in the received data.

When the pertinent information is present in the received data, the operation controller 6 replaces the embedded information in the arbitrary message with the pertinent information in the received data (S123). On the other hand, when no pertinent information exists in the received data, the operation controller 6 replaces the embedded information in the arbitrary message with default information about the type (e.g., a "given WEB site" for a URL, or the like) (S124). The arbitrary message after the replacement in step S123 or in step S124 is displayed on the display 7 in step S108.

Figure 9:
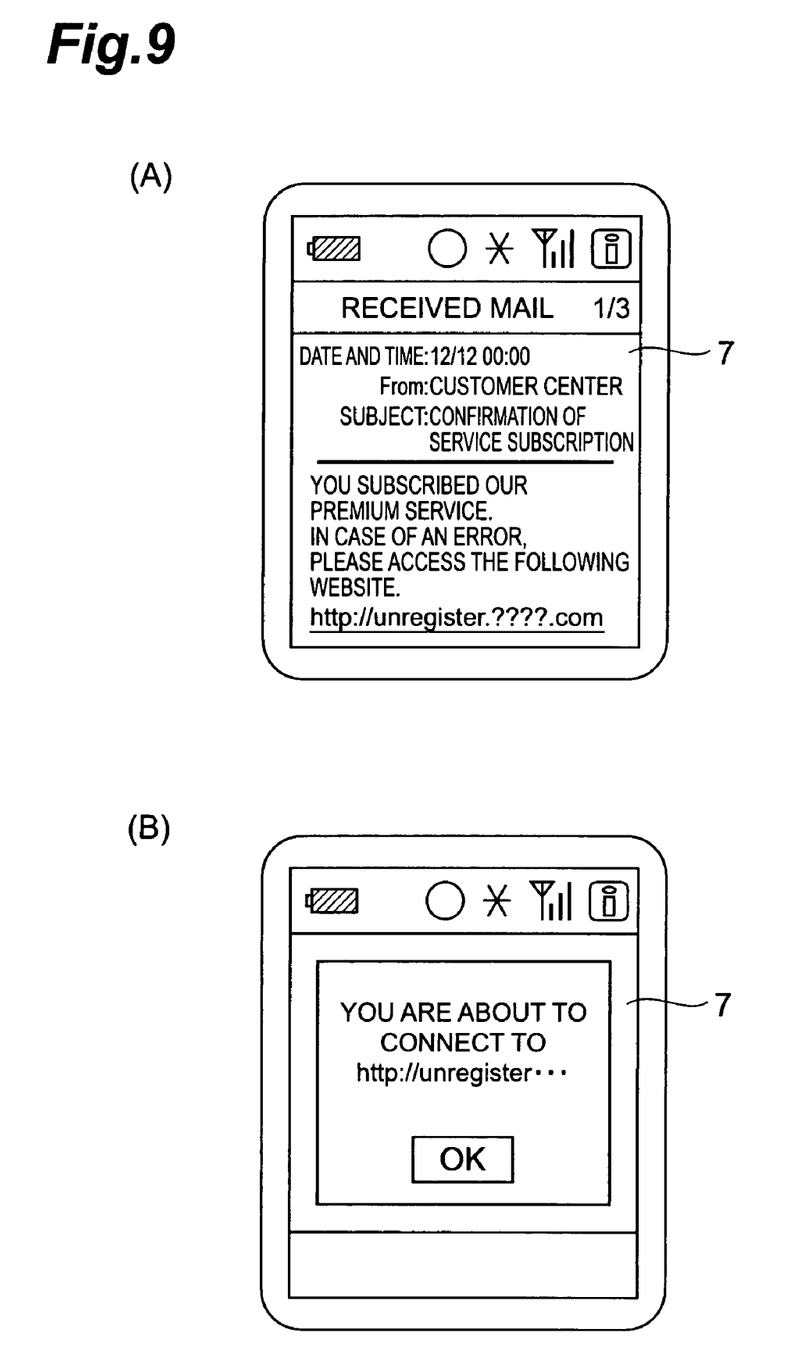
FIG. 9 is a drawing indicating a display of a received mail message containing URL information, and a display of an arbitrary message after embedded information in an arbitrary message is replaced with URL information in the received mail message.

For example, in a case where the problem level 1 is determined by the problem pattern II and where an e-mail message containing a URL shown in FIG. 9(A) is received, the data form is determined to be a URL, and embedded information "% URL %" in the arbitrary message "You are about to connect to % URL %". is replaced with the URL "http://unregister.????.com" in the received mail and the arbitrary message "You are about to connect to http://unregister.????.com". after the replacement is displayed on the display 7 as shown in FIG. 9(B).

In this manner, the information such as the URL, mail address, or phone number is allowed to be embedded in the arbitrary message, and the appropriate arbitrary message according to the content of the received data can be displayed on the display 7.

The embedded information may be defined, for example, as "% TARGET %" so as to include all services about to execute, e.g., start, connection, display, etc. as targets.

The above described the first and second embodiments of the present invention. It is, however, noted that the present invention is by no means limited to only the above embodiments. Namely, the information communication apparatus according to the present invention may be a personal computer or a PDA as well as the mobile equipment such as the cell phone or PHS.

INDUSTRIAL APPLICABILITY

The present invention is applicable to the information communication apparatus and message displaying method for, when there is a problem in received data, displaying a fixed message corresponding to the problem in the received data, and enables the aforementioned flexible treatment according to the problem.

The invention claimed is:

1. An information communication apparatus comprising:
a problem pattern storing module configured to store a problem pattern table, the problem pattern table being updatable, the problem pattern table storing
problem finding information to determine whether or not there is a problem in received data received via a network,
one of a plurality of problem levels classified according to levels of importance of the problem finding information, and
an arbitrary message in correspondence to the problem finding information;
a problem level storing module configured to store a problem level table, the problem level table not being updatable, the problem level table storing
problem levels corresponding to the problem levels stored in the problem pattern table, and
fixed messages that have to be notified to users according to the problem levels;
an originator information storing module configured to store originator information contained in the received data, the originator information being information permitting confirmation of security of the received data;
a communication processing module configured to
access a problem pattern update delivery server via the network, and
download, from the problem pattern update delivery server, update data to update the problem pattern table;

an update processing module configured to update the problem pattern table based on the update data downloaded from the problem pattern update delivery server;

a problem determination processing module configured to
- determine whether or not there is a problem in the received data based on the problem finding information in the problem pattern table, and
- to determine, when the originator information in the received data matches originator information stored in the originator information storing module, that there is no problem in the received data;

an arbitrary message determining module configured to determine, when the problem determination processing module determines that there is a problem in the received data based on the problem finding information, whether or not an arbitrary message corresponding to the problem finding information is stored in the problem pattern table; and a display controlling module configured to
- output the arbitrary message to a display module to display the arbitrary message on the display module when the arbitrary message determining module determines that the arbitrary message corresponding to the problem finding information is stored, and
- acquire, from the problem level table, when the arbitrary message determining module determines that the arbitrary message corresponding to the problem finding information is not stored, a fixed message stored in correspondence to the problem level that corresponds to the problem finding information in the problem pattern table, and output the acquired fixed message to the display module to display the fixed message on the display module.

2. The information communication apparatus according to claim 1, wherein when the arbitrary message is displayed on the display module, the display controlling module
- determines whether the arbitrary message contains embedded information,
- replaces the embedded information in the arbitrary message with information pertinent to the embedded information in the received data when the arbitrary message contains embedded information, and
- displays the arbitrary message on the display module after the embedded information in the arbitrary message is replaced.

3. The information communication apparatus according to claim 1, further comprising:
an action controlling module configured to perform, when a problem is identified in the received data based on the problem finding information, an operation process according to the problem level stored in correspondence to the problem finding information.

4. A message displaying method performed by an information communication apparatus, the message displaying method comprising:
storing, at a problem pattern storing module, a problem pattern table, the problem pattern table being updatable, the problem pattern table storing
- problem finding information to determine whether or not there is a problem in received data received via a network,
- one of a plurality of problem levels classified according to levels of importance of the problem finding information, and
- an arbitrary message in correspondence to the problem finding information;

storing, at a problem level storing module, a problem level table, the problem level table not being updatable, the problem level table storing
- problem levels corresponding to the problem levels stored in the problem pattern table, and
- fixed messages that have to be notified to users according to the problem levels;

storing, at an originator information storing module, originator information contained in the received data, the originator information being information permitting confirmation of security of the received data;

accessing a problem pattern update delivery server via the network;

downloading, from the problem pattern update delivery server, update data to update the problem pattern table;

updating the problem pattern table based on the update data downloaded from the problem pattern update delivery server;

determining whether or not there is a problem in the received data based on the problem finding information in the problem pattern table;

determining, when the originator information in the received data matches originator information stored in the originator information storing module, that there is no problem in the received data;

determining, when it is determined that there is a problem in the received data based on the problem finding information, whether or not an arbitrary message corresponding to the problem finding information is stored in the problem pattern table;

outputting the arbitrary message to a display module to display the arbitrary message on the display module when it is determined that the arbitrary message corresponding to the problem finding information is stored; and acquiring, from the problem level table, when it is determined that the arbitrary message corresponding to the problem finding information is not stored, a fixed message stored in correspondence to the problem level that corresponds to the problem finding information in the problem pattern table, and outputting the acquired fixed message to the display module to display the fixed message on the display module.

5. The message displaying method according to claim 4, further comprising:
- determining, upon display of the arbitrary message, whether the arbitrary message contains embedded information,
- replacing, when the arbitrary message contains the embedded information, the embedded information in the arbitrary message with information pertinent to the embedded information in the received data, and
- displaying the arbitrary message after the embedded information is replaced.

* * * * *